Figure 1:
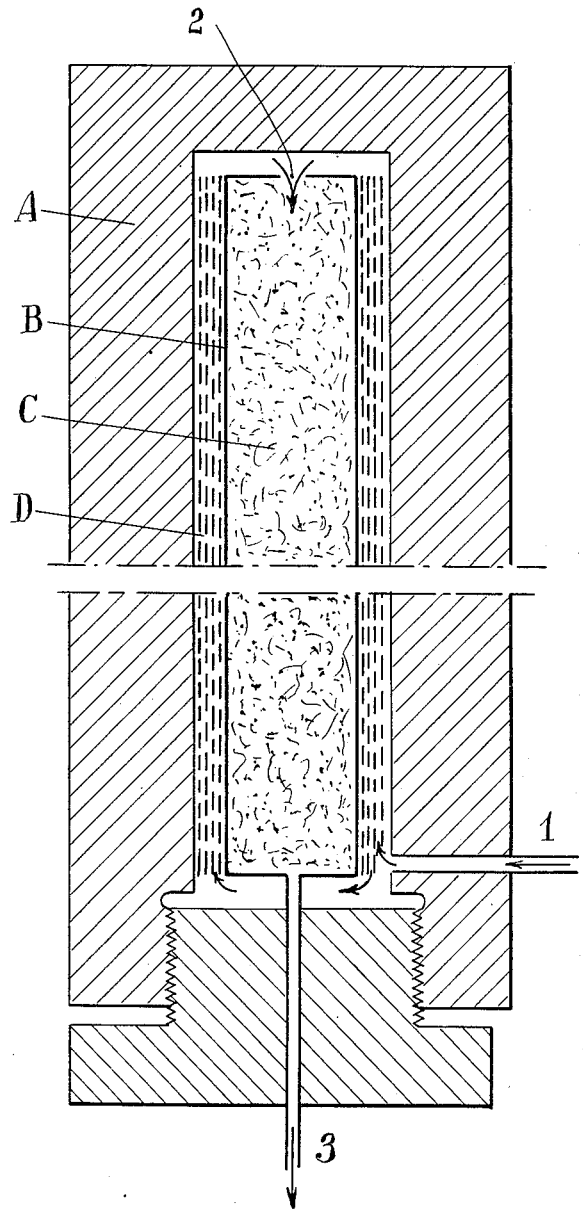

Jan. 2, 1934.        R. DU CHAFFAUT        1,942,021
APPARATUS FOR CARRYING OUT EXOTHERMIC CHEMICAL REACTIONS
Filed March 7, 1929        2 Sheets-Sheet 1

INVENTOR
Roger Du Chaffaut
BY
Pennie Davis Marvin & Edmonds
ATTORNEYS

Jan. 2, 1934.  R. DU CHAFFAUT  1,942,021
APPARATUS FOR CARRYING OUT EXOTHERMIC CHEMICAL REACTIONS
Filed March 7, 1929　　2 Sheets-Sheet 2
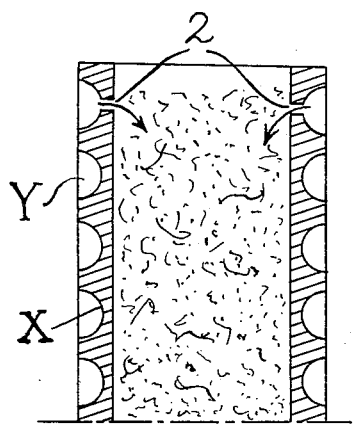
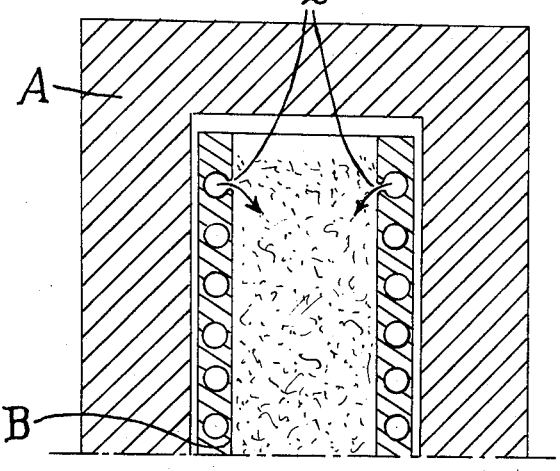
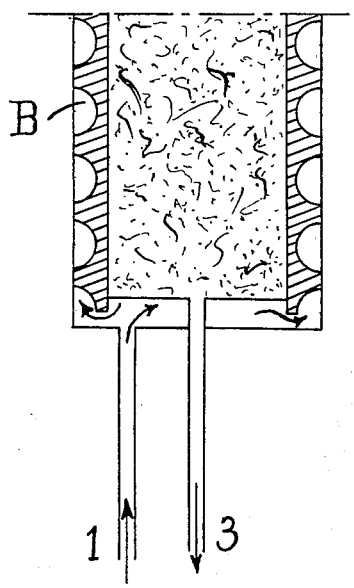
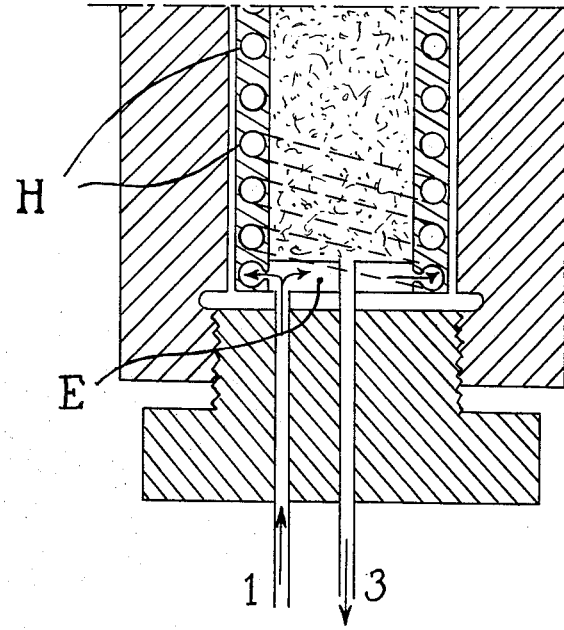
INVENTOR.
Roger DuChaffaut
BY
Pennie Davis Marvin and Edmonds
ATTORNEYS Patented Jan. 2, 1934

1,942,021

UNITED STATES PATENT OFFICE 1,942,021

APPARATUS FOR CARRYING OUT EXOTHERMIC CHEMICAL REACTIONS

Roger Du Chaffaut, Varennes sur Seine, France, assignor, by mesne assignments, to E. I. du Pont de Nemours & Company, Wilmington, Del., a corporation of Delaware Application March 7, 1929, Serial No. 345,161, and in Morocco March 19, 1928

2 Claims. (Cl. 23—289)

This invention relates to processes for carrying out exothermic chemical reactions which take place at a high temperature in the presence of solid or liquid bodies which may or may not be catalyzing materials, and in particular to those processes in which the fluids prior to reaction are heated by circulating them in indirect contact with the said bodies in a restricted space along surfaces separating them from the said bodies. This includes inter alia the case of syntheses under pressure in the presence of solid catalyzing materials, for example the case of the synthesis of ammonia from its elements, and the synthesis from oxides of carbon and hydrogen of oxygenated derivatives of hydrocarbons, particularly methyl alcohol.

The present invention has for its object to improve the conditions of the operation, and in particular to enable a larger quantity of the materials which are to react to be treated with one and the same apparatus than was heretofore possible.

It is known that, for instance in the cases of the synthesis above referred to which take place under a high pressure, the gases which are to react, owing to the pressure to which they are subjected, have only a very restricted space for circulating in indirect contact with the catalyzing material and for becoming heated thereby to a temperature equal or close to the temperature of reaction. Thus for instance in a tube for the synthesis of ammonia under very high pressures, the annular space for such circulation is about one to ten millimetres, and it is impossible to go below these figures as it is necessary to leave a certain play for the expansions caused by the high temperature at which the reaction takes place. It must be pointed out moreover that the expansions may be unequal owing to difference of temperature which cannot be completely avoided and which produce deformations of the wall of the container containing the catalyzing material.

Owing to the smallness of the space for the circulation of the gases, it was believed that the conditions were very favourable for the transmission of heat from the catalyzing material to the gases which are to react and that is why up to now entirely smooth surfaces were used as the surfaces for separating the gases from the catalyzing material.

It has now been found however according to the present invention, and contrary to the assumptions above mentioned, that the results obtained could be improved by using an additional means for improving the indirect contact between the gases or fluids to be heated and the catalyzing or non-catalyzing substances which transmit heat to them, such means adding their effect to the already favourable action due to the narrowness of the space for the circulation of the fluids. Thus for instance by lining the whole or part of the surfaces of contact between the gases which are to react and the catalyzing substance with a material of discontinuous structure such as a wire fabric or gauze, perforated fluted sheet metal, etc., the efficiency of the apparatus is materially increased. The effect of these materials is first that they render uniform and regulate the supply of the fluid by the loss of head which is produced by them, further that they assist the transmission of heat by increasing the speed of the fluid and by producing within the current of fluid eddies which continually renew the fluid which plays on the wall, and finally that they considerably decrease or even eliminate altogether the effects of deformations by expansions.

This latter effect is obtained owing to the regularity of the gaseous current which renders uniform the temperatures of each straight section of the container in such a manner that the expansions become practically equal; moreover where this container is located in the interior of another container capable of withstanding pressure, as in the case of the syntheses above referred to and where the fluids circulate in the space between the two containers, the material which lines the outer container and fills the space in question prevents the inner container from coming into contact with the outer container, and owing to its discontinuous structure, provides a sufficient passage for the fluids.

In order that the said invention may be clearly understood and readily carried into effect, the same will now be described more fully with reference to the accompanying drawings which illustrate diagrammatically by way of example three constructions of apparatus embodying the device according to the present invention.

Referring to Figure 1, A is a tubular metal container which withstands the pressure, and B is a container which contains the catalyzing material C. The fresh gases are admitted through the pipe 1 and circulate in the annular space comprised between the containers B and A where they meet the wire gauze D which produces the effects already described; these gases are thus heated and are then admitted at 2 on to the catalyzer. The products of the reaction as well as the uncombined gases leave the apparatus through the pipe 3.

In the apparatus shown in Figures 2 and 3, the wall of the inner container containing the catalyzing substance is itself constituted by conduits for the circulation of the gases which are to react. In Figure 2, the wall of this container B is formed by winding one or more pipes so as to form one or more spiral coils H with turns closely adjoining each other. The turns are then welded or brazed together so as to form a continuous wall, and if necessary the inner and outer surfaces could be machined. The gases which are to react are admitted through a box E into the coil thus constituted in which they flow at a high speed, whereby the exchanges of heat are greatly assisted. The gases thus heated are admitted at 2 onto the catalyzing material, and the products of the reaction leave the apparatus through the pipe 3.

In Figure 3, the wall of the container B is constituted by two elements; the inner one X is machined on its outside surface so as to produce one or more grooves in the form of one or more helices, whilst the other one Y is a cylindrical casing secured to the outside of the first element by means of shrunk on rings or in some other manner, so as to produce a unit similar to that of Figure 2.

It will of course be understood that the present invention is not limited to the methods of carrying it out just described; more particularly the fluids which are to react could also circulate in indirect contact with catalyzing or non-catalyzing materials in spaces arranged elsewhere than round the container containing the solid bodies in contact with which the reaction takes place.

It need scarcely be remarked that the improvement hereinbefore described could be utilized with any known apparatus. More particularly the tube A could be replaced by a unit comprising a heat insulating screen and a pressure-resisting tube in accordance with the process described in our prior U. S. patent application No. 179,225 dated March 29, 1927, the container B could be provided either inside or outside with a layer of insulating material of such a thickness as to insure that the intensity of the heat exchanges shall have a suitable value at each point as described in our prior U. S. Patent Nos. 1,605,647 and 1,686,799, and the container B could be internally provided with the systems for the circulation of the gases and for rendering the temperatures uniform described in our prior U. S. Patent No. 1,605,647 and patent application No. 178,030 dated March 24, 1927.

What I claim is:

1. An apparatus for effecting catalytic gaseous reactions comprising a catalyst container provided at one end with a gas outlet, the exterior of said container being helically grooved; said container being closely and removably fitted within a shell so as to form a helical gas passage communicating at the end of the catalyst container first named with a gas inlet, and at the other end with the interior of the catalyst container.

2. An apparatus for effecting catalytic gaseous reactions comprising a catalyst container, the longitudinal wall of said container being formed of a helically wound metal tube, the successive turns of which are bound together in gas-tight contact, said tube communicating with the interior of the catalyst container at one end thereof and with a gas inlet at the other end; said catalyst container being provided with a gas outlet at the end first mentioned.

ROGER DU CHAFFAUT.